United States Patent [19]

Mayer et al.

[11] Patent Number: 5,661,196
[45] Date of Patent: Aug. 26, 1997

[54] ORGANOPOLYSILOXANE-CONTAINING COMPOSITIONS WHICH ARE SELF-DISPERSING IN WATER

[75] Inventors: Hans Mayer, Burghausen; Günther Kolleritsch, Neuötting; Ingeborg König-Lumer, Burghausen, all of Germany

[73] Assignee: Wacker-Chemie GmbH, Munich, Germany

[21] Appl. No.: 148,241

[22] Filed: Nov. 8, 1993

[30] Foreign Application Priority Data

Dec. 10, 1992 [DE] Germany ............................ 42 41 727.9

[51] Int. Cl.⁶ .................................................. C08L 83/04
[52] U.S. Cl. .................. 523/122; 106/287.11; 427/387; 524/863; 524/864; 524/858; 524/789; 524/791; 524/779; 524/786; 524/780; 524/787; 524/788; 524/847; 524/701; 524/715
[58] Field of Search ............................ 523/122; 524/863, 524/864, 858, 789, 791, 779, 786, 780, 787, 788, 847, 701, 715; 106/287.11; 427/387

[56] References Cited

U.S. PATENT DOCUMENTS

| | | | |
|---|---|---|---|
| 3,152,161 | 10/1964 | Lisanke et al. | 260/448.2 |
| 3,355,424 | 11/1967 | Brown | 260/46.5 |
| 3,576,779 | 4/1971 | Holdstock | 260/29.2 |
| 4,661,551 | 4/1987 | Mayer et al. | 524/379 |
| 4,757,106 | 7/1988 | Mayer et al. | 524/262 |

FOREIGN PATENT DOCUMENTS

| | | |
|---|---|---|
| 0055606 | 7/1982 | European Pat. Off. . |
| 0068671 | 10/1983 | European Pat. Off. . |
| 0186847 | 7/1986 | European Pat. Off. . |
| 0242798 | 10/1987 | European Pat. Off. . |
| 1444553 | 12/1968 | Germany . |
| 1816392 | 8/1969 | Germany . |
| 1418764 | 11/1969 | Germany . |
| 1769287 | 10/1970 | Germany . |
| 3447636 | 7/1986 | Germany . |
| 914460 | 1/1963 | United Kingdom . |
| 1076259 | 7/1967 | United Kingdom . |
| 1185957 | 4/1970 | United Kingdom . |

OTHER PUBLICATIONS

Derwent Publications Ltd., Week 9009, AN 90–062768 & JP–A–2015011.

*Primary Examiner*—Karen A. Dean
*Attorney, Agent, or Firm*—Martin Connaughton

[57] ABSTRACT

The present invention relates to organopolysiloxane-containing compositions which are self-dispersing in water, their preparation and their use. The compositions of the present invention are suitable for all uses where organosilicon compounds, especially in water-diluted form, can be employed. Such uses include uses as water repellant agents on building materials.

5 Claims, No Drawings

ORGANOPOLYSILOXANE-CONTAINING COMPOSITIONS WHICH ARE SELF-DISPERSING IN WATER

FIELD OF INVENTION

The invention relates to organopolysiloxane-containing compositions which are self-dispersing in water, their preparation and their use.

BACKGROUND OF INVENTION

EP 68 671 A2 (Dow Corning Ltd.; published on Jan. 5, 1983) and U.S. Pat. No. 4,661,551 (Wacker-Chemie GmbH, issued Apr. 28, 1984) and the corresponding DE 34 47 636 A1 (published on Jul. 3, 1986) describe organopolysiloxane-containing compositions which produce transparent mixtures on dilution with water and comprise, as essential constituents, a salt of a water-soluble organic or inorganic acid and an amino-functional organopolysiloxane, a further organosilicon compound and if appropriate a solvent. U.S. Pat. No. 4,757,106 (Wacker-Chemie GmbH; issued Jul. 12, 1988) and the corresponding EP 242 798 A (published Oct. 28, 1987) furthermore describe aqueous emulsions of organopolysiloxanes with SiOC-bonded aliphatic radicals and, as the emulsifying agent, a salt of a water-soluble organic or inorganic acid and an amino-functional organopolysiloxane.

SUMMARY OF INVENTION

The present invention relates to organopolysiloxane-containing compositions which are self-dispersing in water and which comprise (A) a salt of an organic or inorganic acid and an organopolysiloxane which contains SiC-bonded radicals containing basic nitrogen in amounts of at least 0.5% by weight of basic nitrogen, based on the weight of the organopolysiloxane, (B) a solid selected from the group consisting of; (i) fillers, pigments, biocides and UV absorbers having a solubility of less than or equal to one part by weight in 100 parts by weight of water at 20° C. and 1020 hPa, (ii) organosilicon compounds which are solids at 20° C. and less than about 1020 hPa and are soluble up to about 50 parts by weight in 100 parts by weight of (A), and (iii) mixtures thereof and optionally (C) an organosilicon compound containing basic nitrogen in amounts of 0 to 0.5% by weight, based on the weight (C).

"Self-dispersibility" in the context of this invention means that the compositions according to the invention produce stable aqueous dilutions with water spontaneously, and without using the mechanical energy usually expended for the preparation of dispersions, by merely pouring into water and stirring.

The term "basic nitrogen" as used in this invention means nitrogen, calculated as the element.

(A) according to the invention is obtainable by the reaction of an organic or inorganic acid with organopolysiloxanes of the formula

 (I)

in which R can be identical or different and denotes hydrogen or monovalent, SiC-bonded organic radicals which are free from basic nitrogen, $R^1$ can be identical or different and denotes monovalent, SiC-bonded radicals containing basic nitrogen, $R^2$ can be identical or different and denotes hydrogen atoms or monovalent organic radicals, a is 0, 1, 2 or 3, b is 0, 1, 2 or 3 and c is 0, 1, 2 or 3, with the proviso that the sum of a+b+c is less than or equal to 3 and the radical $R^1$ is present in amounts of more than 0.5% by weight of basic nitrogen per organopolysiloxane molecule. The radicals R are preferably optionally substituted hydrocarbon radicals having 1 to 20 carbon atoms, hydrocarbon radicals having 1 to 8 carbon atoms, in particular the methyl and the isooctyl radical, being particularly preferred.

Preferably, a hydrocarbon radical, in particular a methyl radical, is also bonded to each silicon atom to which a hydrogen atom is bonded.

Examples of radicals R are alkyl radicals, such as the methyl, ethyl, n-propyl, iso-propyl, n-butyl, iso-butyl, tert-butyl, n-pentyl, iso-pentyl, neo-pentyl and tert-pentyl radical, hexyl radicals, such as the n-hexyl radical, heptyl radicals, such as the n-heptyl radical, octyl radicals, such as the n-octyl radical and iso-octyl radicals, such as the 2,2,4-trimethylpentyl radical, nonyl radicals, such as the n-nonyl radical, decyl radicals, such as the n-decyl radical, dodecyl radicals, such as the n-dodecyl radical, and octadecyl radicals, such as the n-octadecyl radical; alkenyl radicals, such as the vinyl, allyl, n-5-hexenyl, 4-vinylcyclohexyl and the 3-norbornyl radical; cycloalkyl radicals, such as cyclopentyl, cyclohexyl, 4-ethylcyclohexyl and cycloheptyl radicals norbornyl radicals and methylcyclohexyl radicals; aryl radicals, such as the phenyl, biphenyl, naphthyl and anthryl and phenanthryl radical; alkaryl radicals, such as o-, m- and p-tolyl radicals, xylyl radicals and ethylphenyl radicals; and aralkyl radicals, such as the benzyl radical and the α, β-phenylethyl radical.

Examples of substituted hydrocarbon radicals as the radical R are halogenated hydrocarbon radicals, such as the chloromethyl, 3-chloropropyl, 3-bromopropyl, 3,3,3-trifluoropropyl and 5,5,5,4,4,3,3-heptafluoropentyl radical, and the chlorophenyl, dichlorophenyl and trifluorotolyl radical; mercaptoalkyl radicals, such as the 2-mercaptoethyl and 3-mercaptopropyl radical; cyanoalkyl radicals, such as the 2-cyanoethyl and 3-cyanopropyl radical; acyloxyalkyl radicals, such as the 3-acryloxypropyl and 3-methacryloxypropyl radical; hydroxyalkyl radicals, such as the hydroxypropyl radical, and radicals of the formula

 (II)

The radical $R^1$ is preferably one of the formula

in which $R^3$ can be identical or different and denotes hydrogen or a monovalent hydrocarbon radical which is optionally substituted by amino groups and $R^4$ denotes a divalent hydrocarbon radical.

Examples of the radical $R^3$ are the examples of hydrocarbon radicals given for the radical R and hydrocarbon radicals substituted by amino groups, such as aminoalkyl radicals, the aminoethyl radical being preferred.

Preferably, at least one hydrogen atom is bonded to each nitrogen atom in the radicals of formula (II).

The radicals $R^4$ are preferably divalent hydrocarbon radicals having 1 to 10 carbon atoms, preferably 1 to 4 carbon atoms, in particular the n-propylene radical.

Examples of the radical $R^4$ are the methylene, ethylene, propylene, butylene, cyclohexylene, octadecylene, phenylene and butenylene radical.

Examples of radicals $R^1$ are $H_2N(CH_2)_3—$, $H_2N(CH_2)_2NH(CH_2)_2—$, $H_2N(CH_2)_2NH(CH_2)_3—$, $H_2N(CH_2)_2—$, $H_3CNH(CH_2)_3—$, $C_2H_5NH(CH_2)_3—$, $H_3CNH(CH_2)_2—$, $C_2H_5NH(CH_2)_2—$, $H_2N(CH_2)_4—$, $H_2N(CH_2)_5—$, $H(NHCH_2CH_2)_3—$, $C_4H_9NH(CH_2)_2NH(CH_2)_2$—, cyclo-$C_6H_{11}NH(CH_2)_3$—, cyclo-$C_6H_{11}NH(CH_2)_2$—, $(CH_3)_2N(CH_2)_3$—, $(CH_3)_2N(CH_2)_2$—, $(C_2H_5)_2N(CH_2)_3$—, and $(C_2H_5)_2N(CH_2)_2$—.

The radical $R^1$ is preferably $H_2N(CH_2)_3$— or $H_2N(CH_2)_2NH(CH_2)_3$—, $H_2N(CH_2)_2NH(CH_2)_3$— being particularly preferred.

The radical $R^1$ furthermore can also be cyclic amine radicals, such as piperidyl radicals.

The radicals $R^2$ are preferably hydrogen atoms or alkyl radicals having 1 to 4 carbon atoms, the methyl, ethyl and propyl radical being particularly preferred.

The examples of alkyl radicals R also apply in their full scope to the radical $R^2$.

The average value of a is 0 to 2, preferably 0 to 1.8. The average value of b is 0.1 to 0.6, preferably 0.15 to 0.30. The average value of c is 0 to 0.8, preferably 0.01 to 0.6.

Examples of organopolysiloxanes comprising units of formula (I) are the reaction product of tetraethyl silicate with N-(2-aminoethyl)-3-aminopropyltrimethoxysilane having a viscosity at 25° C. of 6 to 7 mm²/s and an amine number of 2.15 (siloxane i), the reaction product of α,w-dihydroxydimethylpolysiloxane and N-2-(aminoethyl)-3-aminopropyltrimethoxysilane having a viscosity of 20 to 50 mm²/s (25° C.) and an amine number of 2.7 to 3.2 (siloxane ii) and the reaction product of $CH_3Si(OC_2H_5)_{0.8}O_{1.1}$ and N-(2-aminoethyl)-3-aminopropyltrimethoxysilane having a viscosity of 60 mm²/s (25° C.) and an amine number of 2.15 (siloxane iii), (siloxane ii) and (siloxane iii) being preferred and (siloxane ii) being particularly preferred and the amine number corresponding to the number of ml of 1N HCl required to neutralize 1 g of substance.

The organopolysiloxanes comprising units of formula (I) preferably have a viscosity of 6 to 60 mm²/s at 25° C.

Organopolysiloxanes comprising units of formula (I) can be prepared in a known manner, for example, by equilibration or condensation of aminofunctional silanes with organopolysiloxanes which are free from basic nitrogen.

The organic or inorganic acids which are used for the preparation of constituent (A) of the composition according to the invention can be the same as those which it has also been possible to employ to date for the preparation of salts of an organic or inorganic acid and an organopolysiloxane with SiC-bonded radicals containing basic nitrogen. Examples of such acids are HCl, $H_2SO_4$, acetic acid, propionic acid and diethyl hydrogen phosphate, acetic acid and propionic acid being preferred and acetic acid being particularly preferred.

Compounds which can be employed as component (A) in the composition according to the invention are already known. Reference may be made in this context to, for example, the above mentioned U.S. Pat. No. 4,661,551.

The organopolysiloxane salt employed as component (A) can be a single type of this salt or a mixture of at least two types of such a salt.

The hydrophobic solids (B) employed according to the invention, that is to say solids which are soluble to the extent of not more than one part by weight in 100 parts by weight of water at 20° C. under 1020 hPa, are preferably fillers, pigments, biocides and solids which absorb ultraviolet light.

Examples of hydrophobic fillers are non-reinforcing fillers, that is to say fillers having a BET surface area of up to 50 m²/g, such as quartz, diatomaceous earth, calcium silicate, zirconium silicate, zeolites, montmorillonites, such as bentonites, metal oxide powders, such as aluminum oxides, titanium oxides, iron oxides or zinc oxides or mixed oxides thereof, barium sulfate, calcium carbonate, silicon nitride, silicon carbide, boron nitride and powders of glass or plastic; reinforcing fillers, that is to say fillers which have a BET surface area of more than 50 m²/g, such as pyrogenically prepared silicic acid, precipitated silicic acid, carbon black, such as furnace carbon black and acetylene carbon black, and silicon/aluminum mixed oxides of high BET surface area; and fibrous fillers, such as asbestos and synthetic fibers. The fillers mentioned can be hydrophobized, for example by treatment with organosilanes or -siloxanes or by etherification of hydroxyl groups to alkoxy groups.

Examples of pigments are earth pigments, such as chalk, ocher, umber and green earth, mineral pigments, such as titanium dioxide, chromium yellow, minium, zinc yellow, zinc green, cadmium red and cobalt blue, and organic pigments, such as sepia, Cassel brown, indigo, azo pigments and anthraquinoid, indigoid, dioxazine, quinacridone, phthalocyanine, isoindolinone and alkali blue pigments, many of the inorganic pigments also functioning as fillers and vice versa.

Examples of hydrophobic biocides are fungicides, insecticides, herbicides and algicides, such as benzimidazole derivatives.

Examples of solids which absorb ultraviolet light are benzotriazole, tolyltriazole and transparent iron pigment.

The composition according to the invention preferably comprises as solid (B) hydrophobic pyrogenic highly disperse silicic acid having a surface area of about 140 m²/g, which can be prepared by flame hydrolysis of volatile silicon compounds and subsequent hydrophobic treatment with organosilanes.

The compositions according to the invention preferably comprise the hydrophobic solid (B) in amounts of 0.1 to 15 parts by weight, particularly preferably 0.5 to 2 parts by weight, per part by weight of constituent (A).

It is possible to employ one type of solid (B) or a mixture of at least two different types of such solids.

The optional organosilicon compound (C) is preferably one comprising units of the formula

  (III)

in which $R^5$ can be identical or different and denotes hydrogen or monovalent, SiC-bonded organic radicals, $R^6$ can be identical or different and denotes hydrogen atoms or monovalent organic radicals, d is 0, 1, 2, 3 or 4 and e is 0, 1, 2, 3 or 4, with the proviso that the sum of d and e is less than or equal to 4 and the content of basic nitrogen is 0 to 0.5% by weight, based on the weight of the particular organosilicon compound.

Examples of the radical $R^5$ are the examples given for the radical R and hydrocarbon radicals substituted by amino groups, hydrocarbon radicals having 1 to 8 carbon atoms being preferred and the methyl and isooctyl radical being particularly preferred.

Examples of the radical $R^6$ are the examples given for $R^2$, the methyl, ethyl and propyl radical being preferred and the methyl and ethyl radical being particularly preferred.

The organosilicon compound comprising units or formula (III) can be a silane, that is to say the sum of d and e is 4.

The organosilicon compound comprising units of formula (III) can also be an organopolysiloxane, that is to say the sum of d and e is less than or equal to 3.

Examples of silanes of formula (III) are i-octyltrimethoxysilane and i-octyltriethoxysilane.

Examples of organopolysiloxanes comprising units of formula (III) are methylethoxypolysiloxanes, dimethylpolysiloxanes and i-octylmethoxypolysiloxanes.

The organopolysiloxanes comprising units of formula (III) preferably have a viscosity of 5 to 2000 mm$^2$/s, particularly preferably 10 to 500 mm$^2$/s, in each case at 25° C.

The organosilicon compound (C) employed if appropriate is preferably a silane or low molecular weight siloxane, in particular a silane.

A large number of processes for the preparation of the organosilicon compounds comprising units of formula (III) are known.

If an organosilicon compound (C) is used for the preparation of the composition according to the invention, this is employed in amounts of preferably 0.5 to 15 parts by weight, particularly preferably 1 to 3 parts by weight, per part by weight of component (A).

The compositions according to the invention preferably comprise component (C).

The organosilicon compound (C) employed if appropriate can be one type or a mixture of at least two types of such an organosilicon compound.

The compositions according to the invention can comprise further components, such as, for example, a preservative, dispersing agent and organic solvent.

Preferably, however, the compositions according to the invention are free from organic solvent or comprise an organic solvent in amounts of not more than 10% by weight, based on the total weight of component (A) and component (C) employed if appropriate.

The composition according to the invention has a pH of preferably 4 to 7, particularly preferably 5.

The compositions according to the invention are prepared by mixing the organopolysiloxane comprising units of formula (I) with an organic or inorganic acid to form constituent (A) and with constituent (B) and if appropriate with constituent (C). This mixing is preferably carried out at a temperature of 20° to 120° C. under a pressure of 900 to 1100 hPa.

The compositions according to the invention have the advantage that they produce stable aqueous dilutions with water spontaneously, that is to say without high expenditure of mechanical energy, merely by pouring into water and stirring. The hydrophobic solid (B) employed according to the invention is distributed uniformly and very finely dispersed in the water by this operation.

The compositions according to the invention can be diluted with water excellently to give stable mixture. Preferably, the compositions according to the invention are diluted with water in amounts of 50 to 99% by weight, particularly preferably 75 to 99% by weight, in each case based on the total weight of the dilution.

The compositions according to the invention and the mixtures obtained by dilution with water are suitable for all uses where organosilicon compounds, especially in water-diluted form, can be employed, as, for improving the gloss and handle of synthetic leather or natural leather, as agents for water repellent treatment and if appropriate poster repellent treatment in or on mineral building materials, including facades, roads and bridges, such as, for example, roof tiles, bricks, reinforced or non-reinforced non-reinforced concrete, limestone, gypsum, slag bricks, lime sand bricks and asbestos, and as an additive to rendering and water-dilutable paints.

The compositions according to the invention and the mixtures obtained by dilution with water furthermore are suitable as agents which are introduced through holes into walls to block rising damp in masonry, or as agents for blocking other unwanted migration of water, as agents for impregnating finely divided inorganic substances, such as perlite, vermiculite or fillers, as agents for water repellent treatment of metals, textiles, leather, paper and card, as additives to polishes, as agents for water repellent treatment of thermal insulating materials, as dispersing agents or as additives in the polymerization of aliphatic monomers containing carbon-carbon double dons, such as vinyl chloride or vinyl acetate, and as flow improvement agents in water-thinnable coatings.

The compositions according to the invention and the mixtures obtained by dilution with water furthermore are outstandingly suitable for the treatment of wood.

The compositions according to the invention and the mixtures obtained by dilution with water have the advantage that the solid contained therein can be distributed on the substrate in a simple manner and uniformly.

The present invention furthermore relates to a process for the treatment of wood, which comprises applying the composition according to the invention or the mixture obtained by dilution with water to the wood surface to be treated.

Application can be carried out here in a manner known per se, such as, for example, by brushing, dipping, flooding and spraying.

Preferably, the compositions according to the invention are employed as a mixture with water in a ratio of 1:9 for the treatment according to the invention of wood.

The process according to the invention has the advantage that the treated wood has water-repellent properties. Moreover, by the process according to the invention, it is possible to distribute the solid employed as component (B) in the composition according to the invention, in particular pigments or biocides, uniformly and very finely over the wood to be treated.

The process according to the invention furthermore has the advantage that fixing of the solid to the substrate is permanent and washing out is prevented.

In the examples which follow, all the parts and percentages data relate to the weight, unless stated otherwise. Unless stated otherwise, the examples which follow are carried out under ambient pressure, that is to say under about 1000 hPa, and at room temperature, that is to say at about 20° C., or at a temperature which is established when the reactants are brought together at room temperature without additional heating or cooling. All the viscosity data stated in the examples are intended to relate to a temperature of 25° C.

EXAMPLE 1

(A) Preparation of Organopolysiloxanes Containing Basic Nitrogen (Siloxane I)

150 g of N-(2-aminoethyl)-3-aminopropyltrimethoxysilane are added to a mixture of 0.2 g of KOH in 4 g of methanol and 500 g of an α,w-dihydroxydimethylpolysiloxane having an average molecular weight of about 4000 g/mol in a 1 liter three-necked flask fitted with a stirrer, dropping funnel and reflux condenser, while stirring, and the mixture thus obtained is heated at the boiling point under reflux for 6 hours. It is then cooled to 30° C. and 2.5 ml of 10% strength hydrochloric acid are added. Finally, the methanol is distilled off by heating up to 140° C. and the organopolysiloxane thus obtained is freed from KCl by filtration. The resulting organopolysiloxane has a viscosity-molecular weight of 50 mm$^2$/s and contains 2.9% of basic nitrogen, based on its weight.

20 g of the aminosiloxane prepared above under I, 3 g of acetic acid, 47 g of i-octyltrimethoxysilane and 30 g of hydrophobic pyrogenic highly disperse silicic acid (commercially obtainable under the name HDK H 2000 from Wacker-Chemie GmbH) are mixed with one another, a homogeneous mixture with a slight Tyndall effect resulting. The mixture thus obtained is spontaneously self-dispersing when introduced into water, the hydrohobic silicic acid being finely distributed in the water. The 10% strength aqueous dilution thus obtained is stable at room temperature for a period of more than 6 months and shows a particle size of the hydrophobic silicic acid of about 10 to 20 nm under a transmission electron microscope.

COMPARATIVE EXAMPLE 1

10 g of hydrophobic pyrogenic highly disperse silicic acid (commercially obtainable under the name HDK H 2000 from Wacker-Chemie GmbH) is introduced into 100 g of water by pouring and stirring. Even after 24 hours, neither solubility nor wetting of the hydrophobic silicic acid was to be observed.

EXAMPLE 2

(B) Preparation of Organopolysiloxanes Containing Basic Nitrogen (Siloxane II)

150 g of N-(2-aminoethyl)-3-aminopropyltrimethoxysilane are added to a mixture of 0.2 g of KOH in 4 g of methanol and 500 g of an organopolysiloxane of the empirical formula $CH_3Si(OC_2H_5)_{0.8}O_{1.1}$ having an average molecular weight of about 600 g/mol and a viscosity of about 20 mm$^2$/s in a 1 liter three-necked flask fitted with a stirrer, dropping funnel and reflux condenser, while stirring, and the mixture thus obtained is heated at the boiling point under reflux for 6 hours. It is then cooled to 30° C. and 2.5 ml of 10% strength hydrochloric acid are added. Finally, the methanol is distilled off by heating up to 140° C. and the organopolysiloxane thus obtained is freed from KCl by filtration. The resulting organopolysiloxane has a viscosity of 60 mm$^2$/s and a molecular weight of about 1800 and contains 2.9% of basic nitrogen, based on its weight.

25 g of the aminosiloxane prepared above under II, 5 g of propionic acid, 65 g of propyltrimethoxysilane and 5 g of a UV stabilizer which contains benzotriazole as a UV absorber (commercially obtainable under the name "Tinuvin 320" from Ciba-Geigy) are mixed with one another, a homogeneous mixture with a slight Tyndall effect resulting. The mixture thus obtained is spontaneously self-dispersing when introduced into water, the hydrophobic UV stabilizer being finely distributed in the water. The 10% strength aqueous dilution thus obtained is stable at room temperature for a period of more than 6 months and shows a particle size of the UV stabilizer of about 10 to 50 nm under a transmission electron microscope.

COMPARISON EXAMPLE 2

0.1 g of a UV stabilizer containing benzotriazole as a UV absorber (commercially obtainable under the name "Tinuvin 320" from Ciba-Geigy) is introduced into 10 g of water by pouring and stirring. Even after one week, neither solubility nor wetting of the hydrophobic UV stabilizer was to be observed. The UV stabilizer virtually creeps away from the water along the vessel wall.

EXAMPLE 3

A pinewood board (30 cm×15 cm×2 cm) is dipped in 1000 ml of the 10% strength dilution from Example 1 for 10 minutes and then dried at room temperature over a period of 14 days. The wooden board thus treated and also an untreated pinewood board of the same size are then stored in water under pressure. For this, the wooden board is stored in a trough weighted with a weight 5 cm under water. The results of the water uptake, in each case based on the dry weight of the wood, as a function of the storage time are to be found in Table 1.

TABLE 1

| Storage | Treated Wood | Untreated Wood |
| --- | --- | --- |
| 2 hours | 2% | 10% |
| 24 hours | 8% | 30% |

Water applied to the wood treated according to the invention forms beads, a contact angle of 110° being determined.

EXAMPLE 4

A sheet (27 cm×27 cm×0.5 mm) of a roll of wipes of 100% recycled paper (commercially obtainable under the name "Repur clean" from Scott-Feldmühle GmbH) is sprayed uniformly on both sides with 10 ml of the 10% strength dilution from Example 1 and then dried at room temperature for 14 days. The paper thus treated shows a high water repellency and impermeability to liquid water. A container produced from this paper can hold 20 g of liquid water for at least 8 hours without penetration of moisture.

EXAMPLE 5

The procedure described in Example 4 is repeated, with the modification that instead of the paper, woven goods of 100% cotton (bleached) (27 cm×27 cm) is treated. The cotton thus treated shows a high water repellency and impermeability to liquid water, as described in Example 4.

EXAMPLE 6

The procedure described in Example 4 is repeated, with the modification that instead of the paper of the roll of wipes, newspaper (27 cm×27 cm×0.1 mm) is treated. The newspaper thus treated shows a high water repellency and impermeability to liquid water, as described in Example 4.

EXAMPLE 7

Corrugated cardboard (10 cm×20 cm×0.3 cm) is dipped in 1000 ml of the 10% strength dilution from Example 1 for one second and then dried at room temperature for 14 days. The cardboard thus treated and untreated cardboard of the same size are placed on water. After 2 hours, the untreated cardboard is completely soaked with water and has almost disintegrated. In contrast, the cardboard treated according to the invention still floats on the surface of the water even after 24 hours. The water uptake, based on the dry weight of the cardboard, is 5% in this case.

EXAMPLE 8

A pinewood board (7 cm×14 cm×0.5 cm) is dipped in 1000 ml of the 10% strength dilution from Example 2 for 10 minutes and then dried at room temperature over a period of 14 days. Accelerated weathering is then carried out on the wooden board thus treated and on an untreated pinewood board of the same size in a QUV-B weathering apparatus (apparatus from Pausch) for a period of 168 hours. In this procedure, irradiation is carried out in the course of 8 hours, followed by a dew exposure phase of in each case 4 hours, temperatures of up to 42° C. being reached during the irradiation (280–315 nm).

The wooden board treated according to the invention shows a significantly lower darkening of the wood in comparison with the untreated wood specimen. Furthermore, the wooden board treated according to the invention shows a clear beading effect and a greatly reduced water uptake in comparison with the untreated wooden board.

What is claimed is:

1. A self-dispersed composition prepared by, in a first step, forming a mixture consisting of;

(A) a salt of an organic or inorganic acid and an organopolysiloxane which contains SiC-bonded radicals containing basic nitrogen in amounts of at least 0.5% by weight, based on the weight of the organopolysiloxane, and (B) a hydrophobic solid having a solubility of not more than one part by weight in 100 parts by weight of water at 20° C. under 1020 hPa, and in a second step adding the mixture to water.

2. A composition as claimed in claim 1, wherein the organopolysiloxane from which constituent (A) is obtainable by reaction with an organic or inorganic acid is one of the formula

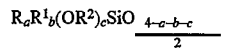 (I)

in which

R can be identical or different and denotes hydrogen or monovalent, SiC-bonded organic radicals which are free from basic nitrogen, $R^1$ can be identical or different and denotes monovalent, SiC-bonded radicals containing basic nitrogen, $R^2$ can be identical or different and denotes hydrogen atoms or monovalent organic radicals, a is 0, 1, 2 or 3, b is 0, 1, 2 or 3 and c is 0, 1, 2 or 3, with the proviso that the sum of a+b+c is less than or equal to 3 and the radical $R^1$ is present in amounts of more than 0.5% by weight of basic nitrogen per organopolysiloxane molecule.

3. A composition as claimed in claim 1, wherein the solid (B) is chosen from the group consisting of fillers, pigments, biocides and solids which absorb ultraviolet light and mixtures thereof.

4. A composition as claimed in claim 1, wherein the solid (B) is present in amounts of 0.1 to 15 parts by weight per part by weight of constituent (A).

5. A process for preparing a self-dispersed composition consisting of the steps;

(A) forming a mixture consisting essentially of a salt of an organic or inorganic acid and an organopolysiloxane which contains SiC-bonded radicals containing basic nitrogen in amounts of at least 0.5% by weight of basic nitrogen, based on the weight of the organopolysiloxane, and a solid selected from the group consisting of;

(i) fillers, pigments, biocides and UV absorbers having a solubility of less than or equal to one part by weight in 100 parts by weight of water at 20° C. and 1020 hPa, (ii) organosilicon compounds which are solids at 20° C. and less than about 1020 hPa and are soluble in concentrations of up to about 50 parts by weight in 100 parts by weight of the salt of an organic or inorganic acid and organopolysiloxane which contains SiC-bonded radicals containing basic nitrogen in amounts of at least 0.5% by weight, and (iii) mixtures thereof, and (B) in a second step adding the mixture to water.

* * * * *